(12) United States Patent
Miyachi et al.

(10) Patent No.: US 6,288,155 B1
(45) Date of Patent: Sep. 11, 2001

(54) THERMAL STABILIZER AND THERMALLY STABILIZED HALOGEN-CONTAINING RESIN COMPOSITION

(75) Inventors: Yasuyoshi Miyachi, Kawasaki; Yasunori Atarashi, Yokkaichi; Takeo Tanaka; Naoki Yasuda, both of Kawasaki, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/277,175

(22) Filed: Mar. 26, 1999

(30) Foreign Application Priority Data

Mar. 26, 1998 (JP) .................................................. 10-079404
Mar. 3, 1999 (JP) .................................................. 11-055257

(51) Int. Cl.$^7$ ........................................................ C08K 3/00
(52) U.S. Cl. ........................... 524/424; 523/200; 523/205; 523/210

(58) Field of Search ..................................... 523/200, 205, 523/210; 524/424

(56) References Cited

U.S. PATENT DOCUMENTS 5,124,373 * 6/1992 Baumgaertel et al. ............... 523/210

FOREIGN PATENT DOCUMENTS 0 422 335   4/1991   (EP) .
2 078 759   1/1982   (GB) .

* cited by examiner

Primary Examiner—Edward J. Cain
(74) Attorney, Agent, or Firm—Oblon, Spivak, McClelland, Maier & Neustadt, P.C.

(57) ABSTRACT

A thermal stabilizer for halogen-containing resins, comprising a compound of the dolomite series and the zinc salt of an organic acid. The thermal stabilizer, when incorporated in a halogen-containing resin, provides an excellent thermal stabilizing effect for the resin.

17 Claims, No Drawings

THERMAL STABILIZER AND THERMALLY STABILIZED HALOGEN-CONTAINING RESIN COMPOSITION

BACKGROUND OF THE INVENTION

1. Field of the Invention

The present invention relates to a novel thermal stabilizer for halogen-containing resins, a halogen-containing resin composition blended with the thermal stabilizer, and a halogen-containing resin-molded article produced by molding the resin composition. More specifically, the invention relates to a compound of the dolomite-type, which is surface treated with a specific compound, a novel thermal stabilizer for halogen-containing resins, which contains the compound of the dolomite-series and the zinc salt of an organic acid, and a halogen-containing resin-molded article produced by molding such a resin composition.

2. Description of the Background

Halogen-containing resins such as vinyl chloride resin are highly flame retardant and have excellent properties including light resistance, recycling potency and chemical resistance. Therefore, the resins are widely used in building materials, pipes, cable coating materials, various sheets, various films and containers.

During molding with the application of heat, the quality of these halogen-containing resins deteriorates. For example, thermal coloring of the resin occurs and the physical properties of the resin such as strength deteriorate because of thermal decomposition of the resin which is accompanied by dehydrohalogenation. In order to overcome such problems, generally, stabilizers are incorporated into halogen-containing resins in order to improve the thermal stability of resins. Suitable such stabilizers (referred to as "thermal stabilizers" hereinbelow) conventionally include metal salts of organic acids such as fatty acids, aromatic carboxylic acids and amino acids. More specifically, lead salts and cadmium salts thereof have been widely used because of their satisfactory property as a thermal stabilizer. Very large amounts of lead-series stabilizers have been used. Because of the seriousness of the toxic problems encountered by using lead salts, their use has been limited. Attention is now focused on organic acid salts of zinc as a safe, alternative thermal stabilizer to the lead stabilizers. However, the thermal stabilization effect of zinc based thermal stabilizer is not satisfactory in comparison to lead based stabilizers. A need, therefore, continues to exist for a zinc based thermal stabilizer for halogen containing resins which exhibits high safety and at the same time exhibits good thermal stabilizing properties.

SUMMARY OF THE INVENTION

Accordingly, one object of the present invention is to provide a halogen-containing resin composition with a great safety profile and excellent thermal stability.

Briefly, this object and other objects of the present invention as hereinafter will become more readily apparent can be attained by a thermal stabilizer for halogen-containing resins which is a blend of a dolomite compound an organic acid salt of zinc.

Another aspect of the invention is a halogen-containing resin composition stabilized with the thermal stabilizer of the invention.

DETAILED DESCRIPTION OF THE PREFERRED EMBODIMENTS

In order to prepare the thermal stabilizer of the present invention a compound of the dolomite series is surface treated with at least one compound selected from inorganic zinc compounds, organic acids, metal salts of organic acids, and polyhydric alcohol compounds.

In accordance with the invention, any compound of the dolomite series may be employed, including dolomite from natural diverse sources, which have been used in the manufacture of wall materials and refractory materials for the iron industry. However, the dolomite used in the invention is not limited to these sources. Because dolomite is of a chemical composition of a complex salt of calcium carbonate and magnesium carbonate, additionally, a chemically synthesized complex salt of calcium carbonate and magnesium carbonate, namely synthetic dolomite, may also be used as the dolomite of the invention. A synthetic dolomite with any composition at a certain ratio of calcium and magnesium may be satisfactorily used in the invention. The weight ratio of calcium and magnesium in the synthetic dolomite used in the invention is preferably within a range of 5:95–95:5 on the basis of MgO and CaO. If a synthetic dolomite outside the constituency range above is employed, the product obtained does not exhibit a satisfactory thermal stabilization effect.

Derivatives of these natural and/or synthetic dolomites, as produced by modifying the dolomites by burning or slaking with no great modification of the composition of the metal elements, may also be used. More specifically, the derivatives include dolomite cement produced by heating the dolomites at 700–800° C., a lightly burned dolomite produced by heating the dolomites at 900–1000° C., a deadly burned dolomite produced by hard burning the dolomites at a high temperature of 1600–1800° C., and dolomite slaked lime produced by adding water to a lightly burned dolomite for digestion, and synthetic magdoloclinker. Other derivatives which may be used include those produced by modifying natural minerals and synthetic complex salts, within the same range of the calcium/magnesium ratio of the synthetic dolomite, in the same manner as described above. Suitable such materials are Acherumanite ($Ca_2MgSi_2O_7$), transparent pyroxene ($CaMg(SiO_3)_2$) and various slags. Furthermore, appropriate mixtures thereof may be satisfactory as well.

In the specification, these dolomites and derivatives are generically referred to as compounds of the dolomite series. These compounds are industrially produced on a large scale in various fields and are used in very diverse industries including the iron industry, the porcelain industry, the building materials industry and agriculture. Because of their stable quality, these materials are readily available economically. When used, especially, the lightly burned dolomite, can produce halogen-containing resin compositions having great thermal stability.

In accordance with the invention, compounds of the dolomite-series which have been surface treated with a specific compound are preferably used. The compounds which are used for the surface treatment (treating agent) include inorganic zinc compounds, organic acids, organic acid metal salts, and polyhydric alcohol compounds. These compounds may be used singly or in appropriate mixtures.

Suitable inorganic zinc compounds include, for example, zinc oxide, zinc carbonate, zinc sulfate, zinc phosphate, zinc sulfite, zinc phosphate and zinc hydroxide. Further, appropriate mixtures of these compounds or complex salts thereof may be employed.

Suitable organic acids include, for example, saturated aliphatic monocarboxylic acids such as acetic acid, propionic acid, butyric acid, valeric acid, caproic acid, octanoic acid, lauric acid, stearic acid, behenic acid; saturated aliphatic dicarboxylic acids such as oxalic acid, malonic acid, succinic acid, adipic acid, terephthalic acid; unsaturated aliphatic carboxylic acids such as acrylic acid, oleic acid, crotonic acid, fumaric acid; carbocyclic carboxylic acids such as benzoic acid, camphoric acid, phthalic acid, toluic acid, hydratropic acid, cinnamic acid; heterocyclic carboxylic acids such as furoic acid, thenoic acid, pyrrolidone carboxylic acid, nicotinic acid; hydroxycarboxylic acids or alkoxycarboxylic acids such as lactic acid, malic acid, benzilic acid, salicylic acid, anisic acid, vanillic acid, protocatechuic acid, gallic acid; amino acids or amino acid derivatives such as glutamic acid, lysine, aspartic acid, glycine, N-stearoyl glycine, N-acetyl glutamic acid, N-lauroyl leucine, γ-methyl glutamate, and the like.

Suitable organic acid metal salts include the metal salts of the organic acids described above. These metals include zinc, calcium, magnesium, potassium, sodium, lithium, iron, aluminum, nickel, copper, and manganese. Furthermore, an appropriate mixture of these organic acid metal salts or a complex salt thereof may also be satisfactory. Surface treatment of the dolomite compound with these organic acid zinc salts can result in a particularly excellent thermal stabilization effect.

Suitable polyhydric alcohols include pentaerythritol, dipentaerythritol, tripentaerythritol, polypentaerythritol, sorbitol, glycerin, and polyglycerin. Additionally, the polyhydric alcohol of the invention includes such compounds which are chemical modified by partial esterification or by partial etherification of the hydroxyl groups in these compounds.

The thermal stabilization effect of the dolomite compound surface treated specifically with pentaerytliritol or dipentaerythritol and esterified products thereof with organic acids, among the polyhydric alcohol compounds, is particularly excellent.

Pentaerythritol and/or dipentaerythritol, partially esterified with a higher fatty acid with 10–22 carbon atoms and a dibasic acid with 4–10 carbon atoms, is especially preferred, since it has additional advantages which include the fact that no staining by mold of materials prepared from these compounds because these compounds do not sublime by the heat applied during molding of the material being prepared, since these organic compounds have high molecular weight, improved processability of the resulting treated powder (surface treated compound of the dolomite series), and good dispersibility of the treated powder in the resins.

Suitable higher fatty acids include, for example, caprylic acid, undecanoic acid, lauric acid, tridecanoic acid, myristic acid, palmitic acid, isostearic acid, stearic acid, 1,2-hydroxystearic acid, oleic acid, linoleic acid, and the like.

Dibasic acids with 4–10 carbon atoms are particularly desirable from the point of view of their low sublimation and thermal stabilization effect, while higher fatty acids with 10–22 carbon atoms contribute to improved processability and the attribute of good dispersibility in the resin. These fatty acids can be appropriately selected depending on the projected use of the halogen-containing resin composition and the blend of materials therein. Pentaerythritol and/or dipentaerythritol, as well as esterified products thereof, in which some of the hydroxyl groups therein are esterified with a higher fatty acid having 10–22 carbon atoms and/or a dibasic acid with 4–10 carbon atoms, can readily be produced by known methods as described in JP 53-06350, JP 57-61289, and JP 55-069639. Some of these substances are commercially available.

If necessary, an appropriate surface treating agent for industrial use may be used in combination with the above surface treatment material, unless this impairs the effect of the invention. More specifically, the surface treating agent includes coupling agents of the silane type, the aluminum type, and the phosphate type; cationic, anionic and nonionic surfactants, and polymer dispersants. So as to yield a sufficient treating agent effect for improved thermal stabilization, the quantity of these surface treating agents is preferably at most equal to or less than the quantity of the compound for use in surface treating compounds of the dolomite series in accordance with the invention.

The amount of the surface treating agent employed in the present invention varies, depending on the type and specific surface area treated of the compound of the dolomite series and the water bound on the surface thereof, but generally, the amount is 0.05–40% by weight, preferably 0.1–20% by weight to the dolomite compound. At an amount less than 0.05% by weight, the effect of surface treatment is not sufficient; when the surface treating agent is added at an amount more than 40% by weight, the effect of surface treatment sometimes is not any more improved.

The method for surface treatment includes the following processes:

1. Adding a surface treating agent as such to powdered dolomite compound and pulverizing the powdered material together with a pulverizer such as a Henschel mixer, a colloid mill, a ball mill or an atomizer;
2. Adding a surface treating agent and a compound of the dolomite-series to an appropriate solvent such as toluene, xylene, methyl ethyl ketone, acetonitrile, chloroform, diethyl ether, water, ethanol and methanol and agitating and mixing these materials together, and subsequently removing the solvent.

Compared with compounds of the dolomite series which have not been surface treated, the surface treated dolomite compound of the invention can exhibit a further enhanced thermal stabilization effect and exerts a significantly improved hydrochloride adsorption effect in the Congo-Red test. More specifically, the surface treated compound of the dolomite series of the invention are very useful compounds for the thermal stabilization of halogen-containing resins.

In the present invention, the compound of the dolomite series is used generally in an amount of at least 0.01 part by weight, preferably at least 0.05 part by weight, per 100 parts by weight of halogen-containing resin. If the amount employed is less than 0.01 part by weight, the desired thermal stabilization effect cannot sufficiently be achieved. If the amount of compound of the dolomite series is above 30 parts by weight, alternatively, the thermal stabilization effect sometimes cannot be further improved. The compound of the dolomite series may be used in an amount of up to about 200 parts by weight. Normally, however, the amount used is preferably 150 parts by weight or less. Above 200 parts by weight, the compound of the dolomite series may result in deterioration of the physical properties of the halogen-containing resin composition, like general fillers, although the compound never results in the deterioration of the thermal stabilization effect of the invention.

The average particle size of the compound of the dolomite series is preferably 100 microns or less, more preferably 10 microns or less. Above 100 microns, the surface of a molded resin product becomes rough, undesirably leading to the deterioration of the quality of the product such as deterioration of the physical properties.

The zinc salt of an organic acid which is used in combination with the compound of the dolomite series for the thermal stabilizer for a halogen-containing resin in accordance of the invention, is now described. The organic acid includes such acids as acetic acid, propionic acid, butyric acid, valeric acid, caproic acid, octanoic acid, lauric acid, stearic acid, behenic acid, benzoic acid, salicylic acid, oleic acid, malic acid, succinic acid, adipic acid, terephthalic acid, trimellitic acid, glutamic acid, lysine, pyrrolidone carboxylic acid, aspartic acid, glycine and the like.

The zinc salt of the organic acid component of the thermal stabilizer of the invention is generally used in an amount of 0.01–20 parts by weight per 100 parts by weight of the halogen-containing resin.

The thermal stabilizer for the halogen-containing resin of the invention may be blended with a polyhydric alcohol compound and/or a β-diketone compound in order to further suppress thermal coloration of the resin, in addition to the compound of the dolomite series (or a surface treated dolomite-series compound), and the zinc salt of such an organic acid.

As the polyhydric alcohol compound which can be employed in the preparation of the thermal stabilizer of the invention, a polyhydric alcohol compound similar to those described above as the treating agent of the dolomite compound, may be used. Preferred polyhydric alcohol compounds are as described above. These polyhydric alcohol compounds may be used singly or in combination of two or more.

The polyhydric alcohol compound is generally employed in an amount of 0.01–10 parts by weight, preferably 0.05–5 parts by weight, per 100 parts by weight of the halogen-containing resin. Below 0.01 part by weight, the synergistic effect of the polyhydric alcohol compound for thermal stabilization cannot be sufficiently exerted; above 10 parts by weight, by contrast, the physical properties of the halogen-containing resin blend may potentially deteriorate.

Suitable β-diketone compounds for use in the invention include appropriate compounds which are produced industrially and disclosed in, for example, JP 52-47949. More specifically, the β-diketone compound includes benzoylacetylmethane, tribenzoylmethane, diacetylbenzoylmethane, stearoylbenzoylmethane, palmitoylbenzoylmethane, benzoylacetylethylmethane, diacetylmethane, triacetylmethane, dibenzoylmethane, distearoylmethane, stearoylacetylmethane, lauroylacetylmethane, and benzoylformylmethane.

Furthermore, the metal salts of these β-diketones, for example, the lithium, sodium, magnesium, aluminum, potassium, calcium, and zinc salts thereof, are satisfactory for use.

The β-diketone compound is generally employed in an amount of 0.01–10 parts by weight, preferably 0.05–5 parts by weight per 100 parts by weight of the halogen-containing resin. Below 0.01 part by weight, the synergistic effect of the β-diketone on the thermal stabilization of the product resin composition sometimes may not be sufficiently exerted. In amounts above 10 parts by weight, alternatively, the physical properties of the halogen-containing resin might be damaged. These β-diketone compounds may be used singly or in combination of two or more.

If necessary, various additives may be blended into the resin composition with satisfactory results, in various amounts as long as they do not impair the effect of the invention with respect to either the thermal stabilizer or the halogen-containing resin composition. For example, plasticizers, fillers, antioxidants, ultraviolet absorbents, flame retardants, lubricants, pigments, antistatic agents, and anti-fogging agents, all for general use in halogen-containing resin compositions, may be blended therewith. Additionally, organic phosphorus compounds and epoxy compounds may also be blended in the resin.

Suitable halogen-containing resins for use in the invention include polyvinyl chloride, polyvinyl bromide, polyvinyl fluoride, polyvinylidene chloride, chlorinated polyethylene, a vinyl chloride-vinyl acetate copolymer and a vinyl chloride butadiene copolymer. Mixed blends of resins may also be used. Additionally, blends of these halogen-containing resins with nonhalogen-containing resins such as polyethylene, polypropylene, polystyrene, polyphenylene ether, polyamide and polycarbonate, may also be employed. Furthermore, olefin resins produced from Ziegler-type catalysts containing the residues of a halogen-containing catalyst may be used. The olefin resins containing the residues of the halogen-containing catalysts are also within the scope of the halogen-containing resin of the invention.

The thermally stabilized halogen-containing resin composition of the invention is kneaded together and is then molded, by any blending process, any kneading process or any molding process, in any order, with no specific restrictions.

Having now generally described the invention, a further understanding can be obtained by reference to certain specific examples which are provided herein for purpose of illustration only and are not intended to be limiting unless otherwise specified.

In the following Examples the term parts means parts by weight.

PRODUCTION EXAMPLE 1

58.3 parts of magnesium hydroxide and 74.1 parts of calcium hydroxide were suspended and then dissolved in 2,000 parts of water, followed by purging of the solution with a carbonate gas under agitation at 10° C. for 3 hours. The precipitate was removed by filtration and dried at 50° C. or less in a carbonate gas atmosphere, thereby recovering 152.3 parts of a complex salt of calcium carbonate and magnesium carbonate (synthetic dolomite). The ratio of calcium to magnesium in the resulting complex salt was 54:46 on a CaO:MgO basis.

PRODUCTION EXAMPLE 2

By burning the calcium carbonate-magnesium complex salt (synthetic dolomite) obtained in Production Example 1 at 1000° C. for one hour, a lightly burned synthetic dolomite was produced.

PRODUCTION EXAMPLE 3

By burning transparent pyroxene ($CaMg(SiO_3)_2$) at 1000° C. for one hour, a lightly burned transparent pyroxene was prepared.

PRODUCTION EXAMPLE 4

73 parts of adipic acid and 284.5 parts of stearic acid were added to 136 parts of pentaerythritol, and esterification was conducted with agitation at 230° C. for 2 hours. Pentaerythritol partially esterified with adipic acid and stearic acid in the mixture (at an esterification ratio of 45–55%) was prepared.

EXAMPLES 1–14 AND COMPARATIVE EXAMPLES 1–5

Halogen-containing resin compositions in the blends shown in Table 1 were individually kneaded together at 155° C. for 5 minutes in a heat roll and were then individually prepared as a 3-mm thick sheet by pressing the resulting kneaded mixtures at 155° C. for 5 minutes in a heat press. Each of the sheets prepared was subjected to a static thermal stability test in a gear oven at 180° C., a dynamic thermal stability test by means in a lavo plastomill at 200° C., and a Congo-Red test at 180° C. In the thermal coloring test, the time required for the sheet to turn dark brownish or partial black was measured, and in the dynamic thermal stability test, the time required for the resin to degrade until the kneaded torque started to increase, was measured. The results of these tests are shown in Table 1. The definitions of the four superscripts in Table 1 are as follows:

*1: "1000Z" (at a polymerization degree of 1050) manufactured by Shin Dai-ichi Vinyl Corporation.

*2: all manufactured by Tagen Lime Industry Co., LTD.

*3: "Plenlizer ST-210" (tradenamed item; manufactured by Ajinomoto Fine-Thchno, Co. Inc.; a compound containing, as the principal ingredient, an adipate ester of dipentaerythritol with an OH value of 900).

*4: "Plenlizer ST-220" (tradenamed item; manufactured by Ajinomoto Fine-Thchno, Co. Inc.; a compound containing, as the principal ingredient, an adipate ester derivative of pentaerythritol with an OH value of 900).

TABLE 1

| | | | Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Formulation Unit: parts by weight | polyvinyl chloride[*1] | (a) | 100 | 100 | 100 | 100 | 100 | 100 | 100 | 100 | 100 | 100 | 100 | 100 | 100 | 100 |
| | dioctyl phthalate | (b) | 50 | 50 | 50 | 50 | 50 | 50 | 50 | 50 | 50 | 50 | 50 | 50 | 50 | 50 |
| | calcium carbonate | (c) | 30 | 30 | 30 | 30 | 30 | 30 | 30 | 30 | 30 | 30 | 30 | 30 | 30 | 30 |
| | zinc stearate | (d) | 1.1 | 1.1 | 1.1 | 1.1 | 1.1 | 1.1 | 1.1 | 1.1 | 1.1 | 1.1 | 1.1 | 1.1 | 1.1 | 1.1 |
| | calcium stearate | (e) | 0.4 | 0.4 | 0.4 | 0.4 | 0.4 | 0.4 | 0.4 | 0.4 | 0.4 | 0.4 | 0.4 | 0.4 | 0.4 | 0.4 |
| dolomite compound | | | | | | | | | | | | | | | | |
| | dolomite[*2] | (f) | 3 | | | | | | 1 | | | | | | | |
| | composition in Production Example 1 | (g) | | 3 | | | | | | | | | | | | |
| | calcined dolomite[*2] | (h) | | | 3 | | | | | 2 | 3 | 3 | 3 | 3 | 3 | 3 |
| | dolomite slaked lime | (i) | | | | 3 | | | | | | | | | | |
| | composition in Production Example 2 | (j) | | | | | 3 | | | | | | | | | |
| | composition in Production Example 3 | (k) | | | | | | 3 | | | | | | | | |
| polyhydric alcohol | | | | | | | | | | | | | | | | |
| | pentaerythritol | (l) | | | | | | | | | 0.5 | | | | | |
| | ST-210[*3] | (m) | | | | | | | | | | 0.5 | | | | |
| | ST-220[*4] | (n) | | | | | | | | | | | 0.5 | | | 0.5 |
| | composition in Production Example 4 | (o) | | | | | | | | | | | | 0.5 | | |
| β-diketone compound | | | | | | | | | | | | | | | | |
| | dibenzoylmethane | (p) | | | | | | | | | | | | | 0.5 | |
| | stearoylbenzoylmethane | (q) | | | | | | | | | | | | | 0.5 | 0.5 |
| lead-type stabilizer | | | | | | | | | | | | | | | | |
| | tribasic lead sulfate | (r) | | | | | | | | | | | | | | |
| | lead stearate | (s) | | | | | | | | | | | | | | |
| Heat coloration test (unit:min.) | | | 110 | 110 | 120 | 110 | 120 | 110 | 120 | 140 | 160 | 160 | 160 | 140 | 140 | 180 |
| Heat stability dynamic test (unit:min.) | | | 51 | 50 | 55 | 63 | 55 | 52 | 61 | 58 | 63 | 65 | 60 | 62 | 63 | 66 |
| Congo red test (unit:min.) | | | 130 | 127 | 165 | 143 | 160 | 118 | 160 | 170 | 190 | 187 | 185 | 175 | 170 | 195 |

| | | | Comparative Example | | | | |
|---|---|---|---|---|---|---|---|
| | | | 1 | 2 | 3 | 4 | 5 |
| Formulation Unit: parts by weight | polyvinyl chloride[*1] | (a) | 100 | 100 | 100 | 100 | 100 |
| | dioctyl phthalate | (b) | 50 | 50 | 50 | 50 | 50 |
| | calcium carbonate | (c) | 30 | 30 | 30 | 30 | 30 |
| | zinc stearate | (d) | 1.1 | 1.1 | 1.1 | 1.1 | |
| | calcium stearate | (e) | 0.4 | 0.4 | 0.4 | 0.4 | |
| dolomite compound | | | | | | | |
| | dolomite[*2] | (f) | | | | | |
| | composition in Production Example 1 | (g) | | | | | |
| | calcined dolomite[*2] | (h) | | | | | |
| | dolomite slaked lime | (i) | | | | | |
| | composition in Production Example 2 | (j) | | | | | |
| | composition in Production Example 3 | (k) | | | | | |
| polyhydric alcohol | | | | | | | |
| | pentaerythritol | (l) | | | 0.5 | 0.5 | |
| | ST-210[*3] | (m) | | | | | |
| | ST-220[*4] | (n) | | | | | |
| | composition in | (o) | | | | | |

TABLE 1-continued

|  |  |  | Production Example 4 β-diketone compound |  |  |  |  |  |
|---|---|---|---|---|---|---|---|---|
|  |  |  | dibenzoylmethane | (p) |  |  |  |  |
|  |  |  | stearoylbenzoylmethane | (q) |  | 0.5 | 0.5 |  |
|  |  |  | lead-type stabilizer |  |  |  |  |  |
|  |  |  | tribasic lead sulfate | (r) |  |  |  | 3 |
|  |  |  | lead stearate | (s) |  |  |  | 1 |
|  |  | Heat coloration test (unit:min.) |  |  | 30 | 120 | 110 | 130 | 110 |
|  |  | Heat stability dynamic test (unit:min.) |  |  | 37 | 40 | 41 | 39 | 62 |
|  |  | Congo red test (unit:min.) |  |  | 52 | 55 | 57 | 55 | 187 |

PRODUCTION EXAMPLE 5

19 kg of non-pulverized dolomite (manufactured by Tagen Lime Industry Co., LTD.) was pulverized together with 1 kg of zinc stearate under deaerated dry conditions for 24 hours. The median diameter of the resulting zinc stearate treated dolomite surface was 1.5 μm.

PRODUCTION EXAMPLE 6

19 kg of non-pulverized dolomite (manufactured by Tagen Lime Industry Co., LTD.) was pulverized together with 1 kg of calcium stearate under deaerated dry conditions for 24 hours. The median diameter of the resulting calcium stearate treated dolomite surface was 1.1 μm.

PRODUCTION EXAMPLE 7

58.3 parts of magnesium hydroxide and 74.1 parts of calcium hydroxide were suspended and then dissolved in 2,000 parts of water, followed by purging of the solution with a carbonate gas while agitated at 10° C. for 3 hours. The precipitate was removed by filtration and dried at 50° C. or less in a carbonate gas atmosphere. 52.3 parts of a complex salt of calcium carbonate and magnesium carbonate (synthetic dolomite) were recovered. The ratio of calcium to magnesium in the resulting complex salt was 54:46 on a CaO:Mgo basis. 1.9 kg of the synthetic dolomite was pulverized, together with 0.1 kg of zinc stearate, under deaerated, dry conditions for 24 hours. The median diameter of the resulting zinc stearate treated synthetic dolomite surface was 1.1 μm.

PRODUCTION EXAMPLE 8

19 kg of a coarsely pulverized, lightly burned dolomite (manufactured by Tagen Lime Industry Co., LTD.) was pulverized, together with 1 kg of zinc stearate, under deaerated, dry conditions for 24 hours. The median diameter of the resulting zinc stearate treated dolomite compound surface was 1.2 μm.

PRODUCTION EXAMPLE 9

19.8 kg of a coarsely pulverized, lightly burned dolomite (manufactured by Tagen Lime Industry Co., LTD.) was pulverized, together with 0.2 kg of zinc oxide, under deaerated, dry conditions for 24 hours. The median diameter of the resulting zinc oxide treated, lightly burned dolomite compound surface was 1.2 μm.

PRODUCTION EXAMPLE 10

19 kg of a coarsely pulverized dolomite slaked lime (manufactured by Tagen Lime Industry Co., LTD.) was pulverized, together with 0.2 kg of zinc lysine salt, 0.5 kg of stearic acid, and 0.3 kg of calcium stearate, under deaerated, dry conditions for 24 hours. The median diameter of the resulting surface treated dolomite compound was 1.3 μm.

EXAMPLES 15–29

Halogen-containing resin compositions of blends shown in Table 2 were tested in the same way as previous examples. The results of these tests are shown in Table 2. The four superscripts of Table 2 are as defined for the superscripts of Table 1.

TABLE 2

|  |  |  | Example |  |  |  |  |  |  |  |  |
|---|---|---|---|---|---|---|---|---|---|---|---|
|  |  |  | 15 | 16 | 17 | 18 | 19 | 20 | 21 | 22 | 23 |
| Formulation | polyvinyl chloride[*1] | (a) | 100 | 100 | 100 | 100 | 100 | 100 | 100 | 100 | 100 |
| Unit: parts | dioctyl phthalate | (b) | 50 | 50 | 50 | 50 | 50 | 50 | 50 | 50 | 50 |
| by weight | calcium carbonate | (c) | 30 | 30 | 30 | 30 | 30 | 30 | 30 | 30 | 30 |
|  | zinc stearate | (d) | 1.10 | 2.04 | 1.10 | 1.10 | 1.10 | 2.04 | 1.10 | 1.10 | 1.10 |
|  | calcium stearate | (e) | 0.40 | 0.40 | 0.40 | 0.40 | 0.40 | 0.40 | 0.40 | 0.40 | 0.40 |
|  | surface treated dolomite compound |  |  |  |  |  |  |  |  |  |  |
|  | composition in Production Example 5 | (f) | 3.16 | 3.16 |  |  |  |  |  |  |  |
|  | composition in Production Example 6 | (g) |  |  | 3.16 |  |  |  |  |  |  |
|  | composition in Production Example 7 | (h) |  |  |  | 3.16 |  |  |  |  |  |
|  | composition in Production Example 8 | (i) |  |  |  |  | 3.16 | 3.16 |  |  | 3.16 |
|  | composition in Production Example 9 | (j) |  |  |  |  |  |  | 3.03 |  |  |
|  | composition in Production Example 10 | (k) |  |  |  |  |  |  |  | 3.16 |  |
|  | non-treated dolomite compound |  |  |  |  |  |  |  |  |  |  |
|  | burned dolomite compound[*2] | (l) |  |  |  |  |  |  |  |  |  |

TABLE 2-continued

| | | | | | | | | | | |
|---|---|---|---|---|---|---|---|---|---|---|
| polyhydric alcohol | | | | | | | | | | |
| pentaerythritol | (m) | | | | | | | | | 0.5 |
| ST-210*3 | (n) | | | | | | | | | |
| ST-220*4 | (o) | | | | | | | | | |
| composition in Production Example 4 | (p) | | | | | | | | | |
| β-diketone compound | | | | | | | | | | |
| dibenzoylmethane | (q) | | | | | | | | | |
| stearoylbenzoylmethane | (r) | | | | | | | | | |
| Heat coloration test (unit:min.) | | 130 | 130 | 120 | 120 | 140 | 150 | 140 | 120 | 160 |
| Heat stability dynamic test (unit:min.) | | 58 | 60 | 56 | 62 | 63 | 64 | 61 | 57 | 65 |
| Congo red test (unit:min.) | | 185 | 198 | 169 | 173 | 213 | 225 | 220 | 202 | 245 |

| | | | | Example | | | | |
|---|---|---|---|---|---|---|---|---|
| | | | | 24 | 25 | 26 | 27 | 28 | 29 |
| Formulation Unit: parts by weight | polyvinyl chloride*1 | (a) | 100 | 100 | 100 | 100 | 100 | 100 |
| | dioctyl phthalate | (b) | 50 | 50 | 50 | 50 | 50 | 50 |
| | calcium carbonate | (c) | 30 | 30 | 30 | 30 | 30 | 30 |
| | zinc stearate | (d) | 1.10 | 1.10 | 1.10 | 1.10 | 1.10 | 1.10 |
| | calcium stearate | (e) | 0.40 | 0.40 | 0.40 | 0.40 | 0.40 | 0.40 |
| surface treated dolomite compound | | | | | | | | |
| | composition in Production Example 5 | (f) | | | | | | |
| | composition in Production Example 6 | (g) | | | | | | |
| | composition in Production Example 7 | (h) | | | | | | |
| | composition in Production Example 8 | (i) | 3.16 | 3.16 | 3.16 | 3.16 | 3.16 | 3.16 |
| | composition in Production Example 9 | (j) | | | | | | |
| | composition in Production Example 10 | (k) | | | | | | |
| non-treated dolomite compound | | | | | | | | |
| | burned dolomite compound*2 | (l) | | | | | | |
| polyhydric alcohol | | | | | | | | |
| | pentaerythritol | (m) | | | | | | |
| | ST-210*3 | (n) | 0.5 | | | | | 0.5 |
| | ST-220*4 | (o) | | 0.5 | | | | |
| | composition in Production Example 4 | (p) | | | 0.5 | | | |
| β-diketone compound | | | | | | | | |
| | dibenzoylmethane | (q) | | | | 0.5 | | |
| | stearoylbenzoylmethane | (r) | | | | | 0.5 | 0.5 |
| Heat coloration test (unit:min.) | | | 160 | 160 | 150 | 150 | 150 | 190 |
| Heat stability dynamic test (unit:min.) | | | 65 | 66 | 62 | 60 | 61 | 68 |
| Congo red test (unit:min.) | | | 250 | 239 | 230 | 225 | 219 | 285 |

PRODUCTION EXAMPLE 11

19 kg of non-pulverized dolomite (manufactured by Tagen Lime Industry Co., LTD.) was pulverized, together with 1 kg of pentaerithrytol, under deaerated, dry conditions for 24 hours. The median diameter of the resulting surface treated dolomite was 1.1 μm.

PRODUCTION EXAMPLE 12

58.3 parts of magnesium hydroxide and 74.1 parts of calcium hydroxide were suspended and dissolved in 2,000 parts of water, followed by purging with a carbonate gas with agitation at 10° C. for 3 hours. The precipitate was removed by filtration and dried at 50° C. or less in a carbonate gas atmosphere. 152.3 parts of a complex salt of calcium carbonate and magnesium carbonate (synthetic dolomite) were then recovered. The ratio of calcium to magnesium in the resulting complex salt was 54:46 on a CaO:MgO basis. 1.9 kg of the synthetic dolomite was pulverized, together with 0.1 kg of pentaerythritol, under deaerated, dry conditions for 24 hours. The median diameter of the resulting zinc stearate treated, synthetic dolomite surface was 1.1 μm.

PRODUCTION EXAMPLE 13

19 kg of a coarsely pulverized, lightly burned dolomite (manufactured by Tagen Lime Industry Co., LTD.) was pulverized, together with 1 kg of dipentaerythritol, under deaerated, dry conditions for 24 hours. The median diameter of the resulting surface treated compound was 1.1 μm.

PRODUCTION EXAMPLE 14

19.8 kg of a coarsely pulverized, lightly burned dolomite (manufactured by Tagen Lime Industry Co., LTD.) was pulverized, together with 1 kg of Plenlizer ST-210 (tradenamed item; manufactured by Ajinomoto Fine-Techno, Co., Inc.; a compound containing, as the principal ingredient, an adipate ester of dipentaerythritol with an OH value of 900) under deaerated, dry conditions for 24 hours. The median diameter of the resulting surface treated compound was 1.3 μm.

PRODUCTION EXAMPLE 15

19 kg of a coarsely pulverized, lightly burned dolomite (manufactured by Tagen Lime Industry Co., LTD.) was pulverized, together with 1 kg of Plenlizer ST-220 (tradenamed item; manufactured by Ajinomoto Fine-Techno, Co. Inc.; a compound containing, as the principal ingredient, an adipate ester derivative of pentaerythritol with an OH value of 900) under deaerated, dry conditions for 24 hours. The median diameter of the resulting surface treated compound was 1.2 μm.

PRODUCTION EXAMPLE 16

19 kg of a coarsely pulverized, lightly burned dolomite (manufactured by Tagen Lime Industry Co., LTD.) was pulverized, together with 1 kg of the compound of Production Example 4, under deaerated, dry conditions for 24 hours. The median diameter of the resulting surface treated compound was 1.2 µm.

PRODUCTION EXAMPLE 17

19.8 kg of a coarsely pulverized, dolomite slaked lime (manufactured by Tagen Lime Industry Co., LTD.) was pulverized, together with 0.15 kg of Plenlizer ST-220 (manufactured by Ajinomoto Fine-Techno, Co. Inc.) and 0.05 kg of zinc stearate, under deaerated, dry conditions for 24 hours. The median diameter of the resulting surface treated compound was 1.3 µm.

PRODUCTION EXAMPLE 18

19.8 kg of a coarsely pulverized, dolomite slaked lime (manufactured by Tagen Lime Industry Co., LTD.) was pulverized, together with 0.15 kg of Plenlizer ST-220 (manufactured by Ajinomoto Fine-Techno, Co. Inc.) and 0.05 kg of Plain Act ALM (tradenamed item; manufactured by Ajinomoto Fine-Techno, Co. Inc.; an aluminum-series coupling agent), under deaerated, dry conditions for 24 hours. The median diameter of the resulting surface treated compound was 1.3 µm.

EXAMPLES 30–45

Halogen-containing resin compositions of the blends shown in Table 2 were tested in the same way as previous examples. The results of these tests are shown in Table 3. The definitions of the superscript in Table 3 are the same as the definitions of the superscripts in Table 1.

TABLE 3

| | | | Example | | | | | | | | |
|---|---|---|---|---|---|---|---|---|---|---|---|
| | | | | 30 | 31 | 32 | 33 | 34 | 35 | 36 | 37 | 38 |
| Formulation Unit: parts by weight | polyvinyl chloride[*1] | (a) | 100 | 100 | 100 | 100 | 100 | 100 | 100 | 100 | 100 |
| | dioctyl phthalate | (b) | 50 | 50 | 50 | 50 | 50 | 50 | 50 | 50 | 50 |
| | calcium carbonate | (c) | 30 | 30 | 30 | 30 | 30 | 30 | 30 | 30 | 30 |
| | zinc stearate | (d) | 1.10 | 1.10 | 1.10 | 1.10 | 1.10 | 1.10 | 1.10 | 1.10 | 1.10 |
| | calcium stearate | (e) | 0.40 | 0.40 | 0.40 | 0.40 | 0.40 | 0.40 | 0.40 | 0.40 | 0.40 |
| surface treated dolomite compound | | | | | | | | | | | |
| | composition in Production Example 11 | (f) | 3.16 | | | | | | | | |
| | composition in Production Example 12 | (g) | | 3.16 | | | | | | | |
| | composition in Production Example 13 | (h) | | | 3.16 | | | | | | |
| | composition in Production Example 14 | (i) | | | | 3.16 | | | | | 3.16 |
| | composition in Production Example 15 | (j) | | | | | 3.16 | | | | |
| | composition in Production Example 16 | (k) | | | | | | 3.16 | | | |
| | composition in Production Example 17 | (l) | | | | | | | 3.03 | | |
| | composition in Production Example 18 | (m) | | | | | | | | 3.03 | |
| non-treated dolomite compound | | | | | | | | | | | |
| | burned dolomite compound[*2] | (o) | | | | | | | | | |
| polyhydric alcohol | | | | | | | | | | | |
| | pentaerythritol | (p) | | | | | | | | | 0.5 |
| | ST-210[*3] | (q) | | | | | | | | | |
| | ST-220[*4] | (r) | | | | | | | | | |
| | composition in Production Example 4 | (s) | | | | | | | | | |
| β-diketone compound | | | | | | | | | | | |
| | dibenzoylmethane | (t) | | | | | | | | | |
| | stearoylbenzoylmethane | (u) | | | | | | | | | |
| Heat coloration test (unit:min.) | | | 120 | 120 | 120 | 130 | 130 | 120 | 120 | 120 | 150 |
| Heat stability dynamic test (unit:min.) | | | 60 | 58 | 58 | 63 | 61 | 60 | 57 | 60 | 65 |
| Congo red test (unit:min.) | | | 180 | 185 | 160 | 220 | 210 | 215 | 200 | 205 | 246 |

| | | | Example | | | | | | |
|---|---|---|---|---|---|---|---|---|---|
| | | | 39 | 40 | 41 | 42 | 43 | 44 | 45 |
| Formulation Unit: parts by weight | polyvinyl chloride[*1] | (a) | 100 | 100 | 100 | 100 | 100 | 100 | 100 |
| | dioctyl phthalate | (b) | 50 | 50 | 50 | 50 | 50 | 50 | 50 |
| | calcium carbonate | (c) | 30 | 30 | 30 | 30 | 30 | 30 | 30 |
| | zinc stearate | (d) | 1.10 | 1.10 | 1.10 | 1.10 | 1.10 | 1.10 | 1.10 |
| | calcium stearate | (e) | 0.40 | 0.40 | 0.40 | 0.40 | 0.40 | 0.40 | 0.40 |

TABLE 3-continued

| surface treated dolomite compound | | | | | | | | |
|---|---|---|---|---|---|---|---|---|
| composition in Production Example 11 | (f) | | | | | | | |
| composition in Production Example 12 | (g) | | | | | | | |
| composition in Production Example 13 | (h) | | | | | | | |
| composition in Production Example 14 | (i) | 3.16 | 3.16 | 3.16 | 3.16 | 3.16 | 3.16 | |
| composition in Production Example 15 | (j) | | | | | | | 3.16 |
| composition in Production Example 16 | (k) | | | | | | | |
| composition in Production Example 17 | (l) | | | | | | | |
| composition in Production Example 18 | (m) | | | | | | | |
| non-treated dolomite compound | | | | | | | | |
| burned dolomite compound[*2] | (o) | | | | | | | |
| polyhydric alcohol | | | | | | | | |
| pentaerythritol | (p) | | | | | | | |
| ST-210[*3] | (q) | 0.5 | | | | | 0.5 | |
| ST-220[*4] | (r) | | 0.5 | | | | | 2.34 |
| composition in Production Example 4 | (s) | | | 0.5 | | | | |
| β-diketone compound | | | | | | | | |
| dibenzoylmethane | (t) | | | | 0.5 | | | |
| stearoylbenzoylmethane | (u) | | | | | 0.5 | 0.5 | |
| Heat coloration test (unit:min.) | | 160 | 150 | 150 | 140 | 140 | 160 | 170 |
| Heat stability dynamic test (unit:min.) | | 65 | 66 | 62 | 60 | 59 | 66 | 70 |
| Congo red test (unit:min.) | | 250 | 244 | 240 | 225 | 226 | 255 | 290 |

As described above, the present invention provides an effective thermal stabilizer for halogen-containing resins such as vinyl chloride resin whose thermal stability not only can be improved, but also its safety profile greatly improved.

The disclosures of priority Japanese Application No. 79404/1998 filed Mar. 26, 1998 and Japanese Application No. 55257/1999 filed Mar. 3, 1999 are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent:

1. A thermal stabilizer for halogen-containing resins, comprising:
   a compound of the dolomite series and the zinc salt of an organic acid.

2. The thermal stabilizer according to claim 1, wherein the compound of the dolomite series is surface treated with at least one material selected from the group consisting of inorganic zinc compounds, organic acids, metal salts of organic acids and polyhydric alcohol compounds.

3. The thermal stabilizer according to claim 1, wherein the thermal stabilizer further comprises a polyhydric alcohol compound, a β-diketone compound or a combination thereof.

4. The thermal stabilizer according to claim 1, wherein the compound of the dolomite series is dolomite of natural origin and/or a synthetic dolomite comprising a complex salt of calcium carbonate and magnesium carbonate.

5. The thermal stabilizer according to claim 1, wherein the weight ratio of the magnesium to calcium in the compound of the dolomite series is 5:95–95:5 on the basis of MgO and CaO.

6. The thermal stabilizer according to claim 1, wherein the compound of the dolomite series compound contains a lightly burned dolomite produced by lightly burning a complex salt compound at the weight ratio of Mg and Ca being 5:95–95:5 on the bases of MgO and CaO.

7. The thermal stabilizer according to claim 2, wherein the inorganic zinc compound is zinc oxide, zinc carbonate, zinc sulfate, zinc phosphate, zinc sulfite, zinc phosphate or zinc hydroxide.

8. The thermal stabilizer according to claim 1, wherein the organic acid is a saturated aliphatic monocarboxylic acid, a saturated aliphatic dicarboxylic acid, an unsaturated aliphatic carboxylic acid, a carbocyclic carboxylic acid, a heterocyclic carboxylic acid, a hydroxycarboxylic acid or alkoxycarboxylic acid, an amino acid or amino acid.

9. The thermal stabilizer according to claim 1, wherein the organic acid metal salt is the metal salts of an organic acid as described above in which the metal is zinc, calcium, magnesium, potassium, sodium, lithium, iron, aluminum, nickel, copper or manganese.

10. The thermal stabilizer according to claim 1, wherein the polyhydric alcohol is pentaerythritol, dipentaerythritol, tripentaerythritol, polypentaerythritol, sorbitol, glycerin or polyglycerin.

11. The thermal stabilizer according to claim 3, wherein the β-diketone compound is benzoylacetylmethane, tribenzoylmethane, diacetylbenzoylmethane, stearoylbenzoylmethane, palmitoylbenzoylmethane, benzoylacetylethylmethane, diacetylmethane, triacetylmethane, dibenzoylmethane, distearoylmethane, stearoylacetylmethane, lauroylacetylmethane or benzoylformylmethane.

12. The thermal stabilizer according to claim 3, wherein the polyhydric alcohol compound and/or β-diketone compound in an amount of 0.01–10 parts by weight is combined with 100 parts by weight of said halogen-containing resin.

13. A halogen-containing resin composition, comprising:
a halogen-containing resin containing the thermal stabilizer according to claim 1.

14. The halogen-containing resin composition according to claim 13, wherein said thermal stabilizer in an amount of 0.01–150 parts by weight is blended with 100 parts by weight of said halogen-containing resin.

15. A halogen-containing resin-molded article prepared by molding a halogen-containing resin composition according to claim 13.

16. A compound of the dolomite series surface treated with at least one member selected from the group consisting of inorganic zinc compounds, organic acids, metal salts of organic acids and polyhydric alcohol compounds.

17. A method of thermally stabilizing a halogen-containing resin, comprising:
compounding the thermal stabilizer compound according to claim 16 with a halogen-containing resin.

* * * * *